United States Patent [19]

Goodman

[11] Patent Number: 5,029,099

[45] Date of Patent: Jul. 2, 1991

[54] METHOD AND APPARATUS FOR VENDING CUSTOMIZED DOCUMENTS

[75] Inventor: Sidney R. Goodman, La Jolla, Calif.

[73] Assignee: Postal Buddy Corporation, San Diego, Calif.

[21] Appl. No.: 284,065

[22] Filed: Dec. 13, 1988

[51] Int. Cl.$^5$ .............................................. G07F 7/02
[52] U.S. Cl. .................................... 364/479; 235/381
[58] Field of Search ........ 364/479, 478, 401, 403–405, 364/408; 235/381; 340/825.35; 194/217

[56] References Cited

U.S. PATENT DOCUMENTS

| | | | |
|---|---|---|---|
| 3,688,276 | 8/1972 | Quinn | 364/200 |
| 4,034,839 | 7/1977 | Lee | 364/479 |
| 4,096,933 | 6/1978 | Massa | 364/479 |
| 4,354,613 | 10/1982 | Desia et al. | 364/479 |
| 4,359,634 | 11/1982 | Lockwood et al. | 364/479 |
| 4,412,292 | 10/1983 | Sedam et al. | 364/479 |
| 4,481,590 | 11/1984 | Otten | 364/479 |
| 4,567,359 | 1/1986 | Lockwood | 235/381 |
| 4,654,799 | 3/1987 | Ogaki et al. | 364/479 |
| 4,655,026 | 4/1987 | Wigoda | 364/479 |
| 4,672,554 | 6/1987 | Ogaki | 364/479 |
| 4,674,055 | 6/1987 | Osaki et al. | 364/479 |
| 4,677,565 | 6/1987 | Osaki et al. | 235/381 |
| 4,787,050 | 11/1988 | Suzuki | 364/479 |
| 4,789,907 | 12/1988 | Fischetti et al. | 360/92 |
| 4,801,375 | 1/1989 | Padilla | 364/479 |
| 4,833,307 | 5/1989 | Gonzalez-Justiz | 235/381 |

FOREIGN PATENT DOCUMENTS

| | | | |
|---|---|---|---|
| 0010399 | 4/1980 | European Pat. Off. | 235/381 |
| 0103759 | 3/1984 | European Pat. Off. | 235/381 |
| 0033573 | 2/1984 | Japan | 235/381 |

OTHER PUBLICATIONS

Mitsubishi Denki Giho. vol. 55, No. 4; pp. 35–39 (1981). Melpas-I Ticket Issuing Apparatus; Murato et al.

Primary Examiner—Allen R. MacDonald
Attorney, Agent, or Firm—Bernard L. Kleinke; William Patrick Waters; Jerry R. Potts

[57] ABSTRACT

A customized document vending system includes an input device for receiving and storing customized input information for producing and vending customized documents for the customer. In response to the receipt of the customized input information, a device generates and supplies cost information to the customer. Responsive to signals indicative of the correct payment corresponding to the cost information being received, a device produces the customized documents.

15 Claims, 9 Drawing Sheets

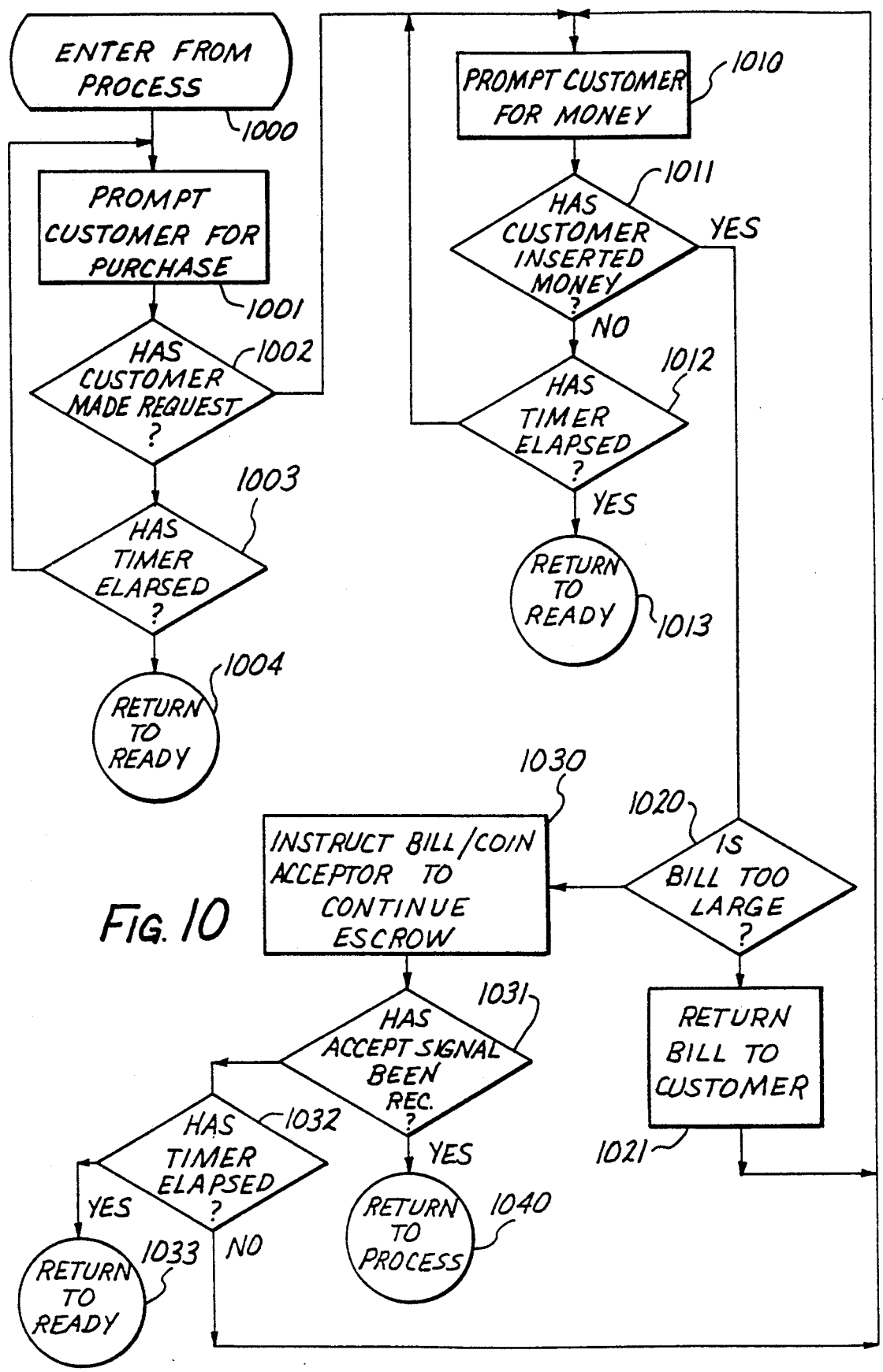

METHOD AND APPARATUS FOR VENDING CUSTOMIZED DOCUMENTS

DESCRIPTION

1. Technical Field

This invention relates in general to a method and apparatus for vending customized documents. More particularly, the present invention relates to a self-service system for vending customized documents, such as return-address mailing labels, business cards, or the like.

2. Background Art

There are various different customized documents, such as return address mailing labels, business cards, and the like, have been printed in quantities for sale to customers. While prior known printing techniques may have been satisfactory for some applications, delays in delivering such customized materials have not always been tolerable to the customers.

Thus, it would be highly desirable to have a self-service customized document vending system. Such a system could enable a customer to produce his or her own customized documents without delay. In this regard, the customer would operate the vending system himself or herself, without the assistance of the owner of the system, in an automatic mode of operation.

Such vending systems could be installed at many locations, such as a store, a post office or any other place where the public may frequent. Thus, such a vending system would not only be able to vend such customized documents in a rapid manner, but also would be convenient to use and would be provided at many convenient locations for use by the public.

Such a vending system must not only be convenient to use, but also be adapted to perform a variety of functions, and be able to exact an appropriate charge for each such customized document. For example, where customized documents require special fonts and different shaped sizes and/or colors, or other special or customized features, separate charges must be made, depending on the particular type or kind of customized document. Thus, it would be highly desirable to have a new and improved customized document vending system, which is adapted to create documents of various shapes, fonts and color, and/or specialized features in a convenient manner, so that the system can be operated by members of the public. As a result, such a new and improved vending system should not only be able to produce and to vend a variety of types and kinds of customized documents, but also it should secure an appropriate payment for the selected customized document, in an efficient and effective manner.

DISCLOSURE OF INVENTION

Therefore, it is the principal object of the present invention to provide a new and improved system and method for vending customized documents to customers, such as members of the general public, in a convenient and efficient manner.

Another object of the present invention is to provide such a new and improved system and method particularly useful for customized documents, having a variety of different possible characteristics, such as size, printing style, color, and others.

It is also an object of the invention to provide such a new and improved vending system and method to enable an appropriate charge to be made for the desired customized document.

Briefly, the above and further objects of the present invention are realized by providing a new and improved method and apparatus for vending customized documents such as mailing labels, business cards, or the like in a relatively convenient and efficient manner.

A customized document vending system includes an input device for receiving and storing customized input information for producing and vending customized documents for the customer. In response to the receipt of the customized input information, a device generates and supplies cost information to the customer. Responsive to signals indicative of the correct payment corresponding to the cost information being received, a device produces the customized documents.

In the preferred form of the invention, the system is used to produce and to vend customized documents in the form of return address labels. In such an arrangement, there is provided self service sales and information terminals, which include a data processing computer, a bill and coin acceptor, an interactive communication interface between the data processing computer and the bill and coin acceptor mechanism, a video display for displaying sales and inquiry information to the customers, and a printing to furnish the customer with the requested mailing labels. In its operation, the system carries out the following steps for producing and vending labels:

1. Queries from a customer are accepted by the self service sales and information terminal as to the label type, size, color and printing format;
2. The terminal solicits any necessary information from the customer in order to answer the queries;
3. Customer information and queries are transmitted to the data processing computer;
4. Relevant data are retrieved from data sources, processed and transmitted to the video terminal for responding to the customer;
5. If the customer elects to make a purchase of label in response to the data received, the system receives the customers monetary remittance for the labels requested and returns the required change, if any, to the customer; and
6. On receipt of the appropriate monetary remittance, the requested labels are dispensed to the customer.

The computer contains information on various label sizes, print font types and pricing. The terminal is programmed to audio visually elicit from the customer the information necessary to provide a label quotation for the type and size of label requested. If the customer elects to purchase the quoted label, the terminal accepts the customer's money, returns any required change and dispenses the requested labels.

The system saves considerable money and time for both the customers and the printing company. The customer does not have to personally visit or telephone the printing company in order to obtain a quotation, and the company does not have to provide sales personnel or equipment operation personnel, to deal with multiple queries on a one-to-one basis. Since many of these queries do not result in sales, company time which would otherwise be wasted is saved.

The terminal may be located at a convenient location, such as at the post office, supermarkets convenience stores, and so on.

The data processing computer stores information on the label types and prices and is programmed to gather a predetermined sequence of information from a customer on the labels in which the customer is interested and to process the information and transmit back to the video terminal from the customers information. Subsequently, the terminal is programmed to accept an order for the offered labels from the customer, to collect payment and to vend the labels to the customer.

Thus, a customer is asked pertinent questions on the types of labels desired, the quantity desired and the information necessary to process a quotation for that particular type of label selected. The gathered information is sent to the computer where the quotation is processed and transmitted back to the video terminal. The customer is then given an opportunity to purchase the selected labels. If a set of labels are desired, the system accepts the customer's money, verifies the correct amount has been received, returns any necessary change, and prints and vends the requested mailing labels with the information requested by the customer.

In view of the foregoing, the system of the present invention enables customized documents to be produced and vended to a customer. Since the document is customized, various different parameters of documents can be accounted for and thus charged the client, in a convenient, self-service mode of operation.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 3-10 are flowchart diagrams of software programs used for controlling the system of FIG. 1.

BEST MODE FOR CARRYING OUT THE INVENTION

Figure 1:
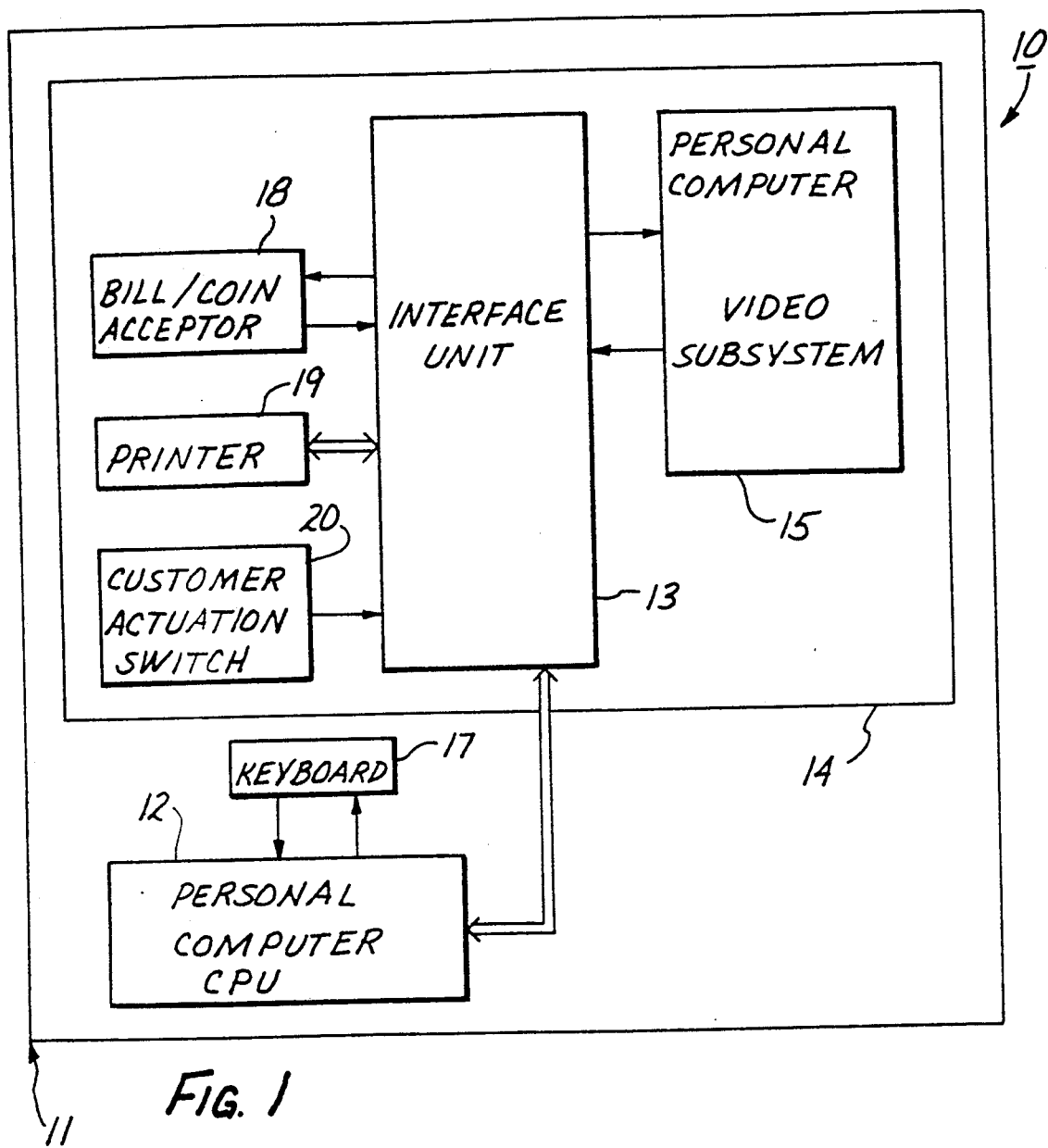
FIG. 1 is a block diagram of a customized document vending system, which is constructed in accordance with the present invention.

Referring now to the drawings, and more particularly to FIG. 1 thereof, there is shown a self-service customized document vending system 10, which is constructed in accordance with the present invention, and which is adapted to produce and to vend customized documents in the form of return address mailing labels. While mailing labels are shown and described herein, it should also be understood that other customized documents may also be produced and supplied by the vending system of the present invention.

Considering now the inventive label making system 10 in greater detail with reference to FIG. 1, the system 10 generally includes a self service sales and information terminal housing 11, which encloses a personal computer CPU 12. The personal computer CPU 12 is an IBM PS-2 Model 25 or equivalent and includes a video subsystem 15, a keyboard 17 and a storage unit (not shown). The video subsystem 15 includes a conventional video monitor 29. The video subsystem 15 is manufactured by IBM for use with the IBM PS-2 Model 25 personal computers.

The keyboard 17 is similar to a conventional keyboard utilized with the PS-2 Model 25 system except that the keyboard 17 has certain keys disabled such as the ALT/DELETE keys. The personal computer CPU 12 is connected to an interface unit 13 for enabling a customer user of the system to solicit sales information and to purchase various types of printed documents in the form of customized mailing labels. The sales and information terminal 11 is installed at various convenient locations, such as post offices, shopping malls, and so on.

The terminal 11 is designed to provide the same level of service as would a well-informed sales representative and to interface with the customer by means of the communications and peripheral communication subsystem 14.

The interface unit 13 is also connected to the system peripherals that includes a bill/coin acceptor 18, printer 19, and customer activation switch 20.

The interface unit 13 enables the personal computer CPU 12 to sense the activation of a customer activation switch 20 and to coordinate the operation of the bill-/coin acceptor 18 with the other peripheral units of the system 10.

The bill/coin acceptor 18 includes a Mars Electronics Model TRC 6000 Coin Acceptor and a Model L020-U4C Bill Acceptor. The printer 19 is a Hewlett Packard LaserJet Model IIP$^D$ or the equivalent.

There is also an optional feature (not shown) which includes a modified interface unit 13 and bill/coin acceptor 18 for allowing the system to accept standard credit cards in lieu of bills and coins.

Considering now the interface unit 13 in greater detail with reference to FIG. 1, the interface unit 13 links the various peripheral units with the personal computer coin 12. In this manner, the personal computer CPU 12 is able to coordinate the operation of the bill/coin acceptor 18 with the other peripheral units of the System. The interface unit 13 includes a conventional communication subsystem RS232 serial circuit (not shown) for converting the signals received from the coin/bill acceptor 18 acceptable to the personal computer CPU 12. The interface unit 13 also converts the bill/coin acceptor 18 signals into proper formatting for processing by the personal computer CPU 12, such as ASCII format.

The interface unit 13 of the peripheral communication subsystem 14 is programmed to detect the presence of a prospective customer via an actuation device 20. When the actuation device 20 of the terminal 11 is activated, a customer detection signal is transmitted via the interface unit 13 to the video subsystem 15, which operates to commence playing a pre-arranged video presentation.

Figure 2:
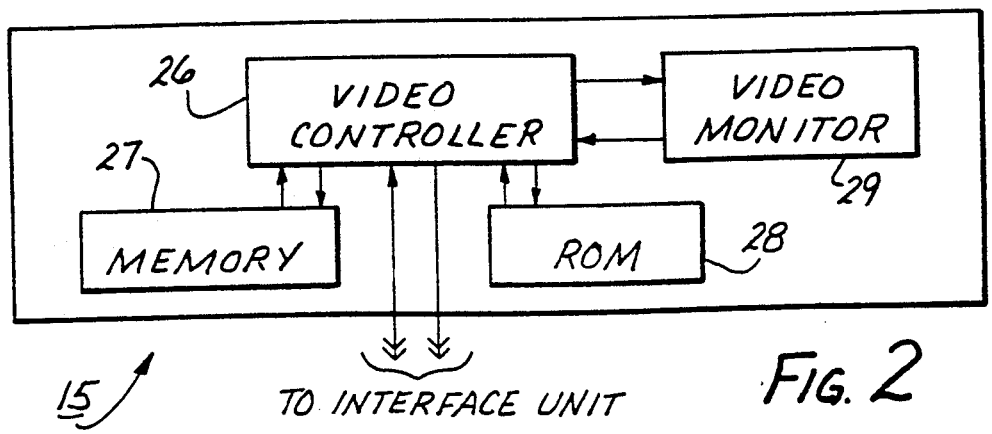
FIG. 2 is a block diagram of the video subsystem of the vending system of FIG. 1.

Considering now the video subsystem 15 in greater detail with reference to FIG. 2, the video subsystem 15 basically comprises a video controller 26 associated with a memory 27 for controlling operation of the video subsystem 15, a read only memory or software unit 28, and a video monitor 29. The video subsystem 15 is connected to the interface unit 13 so that the operation of the video subsystem 15 presentation may be coordinated with the operation of the bill and coin acceptor 18, and printer 19.

Considering now the operation of the video subsystem 15 in greater detail with reference to FIGS. 1 and 2, the video subsystem 15 via the personal computer CPU 12, commences the preprogrammed video presentation stored in the storage unit (not shown) once the interface unit 13 transmits a customer detection signal to the personal computer CPU 12. The video presentation then solicits and allows the customer to enter information at various points via the keyboard terminal 17 and messages displayed on the monitor screen 29.

The personal computer 12, processes the information it receives from the interface unit 13 and sends information back to the interface unit 13. Information received back from the data processing personal computer 12, for example, a printing label quotation, is also displayed on the monitor 29.

The video subsystem 15 via the personal computer CPU 12 then continues the presentation asking the customer whether or not he or she wishes to make a purchase. If a purchase order is entered, the customer places an appropriate amount of money comprised of bills and coins in the bill and coin mechanism 18. The type of money inserted in the bill and coin mechanism 18 is transmitted to the data processing personal computer 12 via the interface unit 13. The personal computer CPU 12 upon receipt of the type of money received calculates the amount of money inserted into the bill and coin mechanism 18 to determine whether an appropriate amount of money has been remitted by the customer. If an inappropriate amount of money has been received or an insufficient amount of money has been received, the personal computer 12 transmits a signal that causes the video monitor 29 to display a message requesting that a correct amount of money be inserted into the bill and coin mechanism 18. Upon receipt of an appropriate amount of money, the requested mailing labels are vended via the label printer 19.

Considering now the operation of the system 10 in greater detail, in connection with the following description of the software residing in the personal computer and in the video subsystem with reference to FIGS. 3-10, the customer upon actuating the terminal actuation device 20, is confronted with a series of messages which appear on the video screen, solicits data, displays answers, and gives instructions about the use of the system, and generally creates the impression of dealing with a live person. These operations are under the master control of the personal computer 12.

The data processing personal computer 12 includes the storage unit (not shown) for storing program information and information on labels or prices for various types and quantities of labels. The data processing personal computer 12 operates in response to program instructions to: 1) perform label quotation calculations in response to customer information received from the keyboard terminal 17; 2) to send quotation data to the interface unit 13 so that the video controller 26 will display such data on the video monitor 29; 3) and to receive monetary information from the bill and coin acceptor 18 for payment approval or disapproval.

If a customer makes a purchaser order after inserting the appropriate amount of money, the data processing personal computer 12 stores the label information and sends instruction to the label printer 19 to print an appropriate amount of labels.

Figure 3:
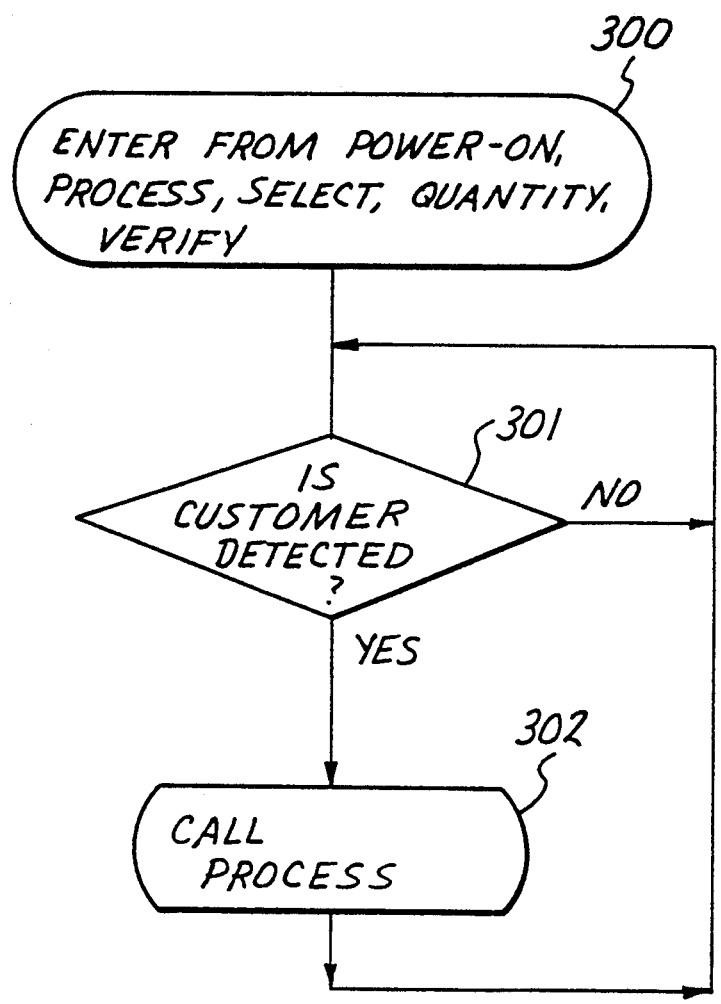
Figure 4:
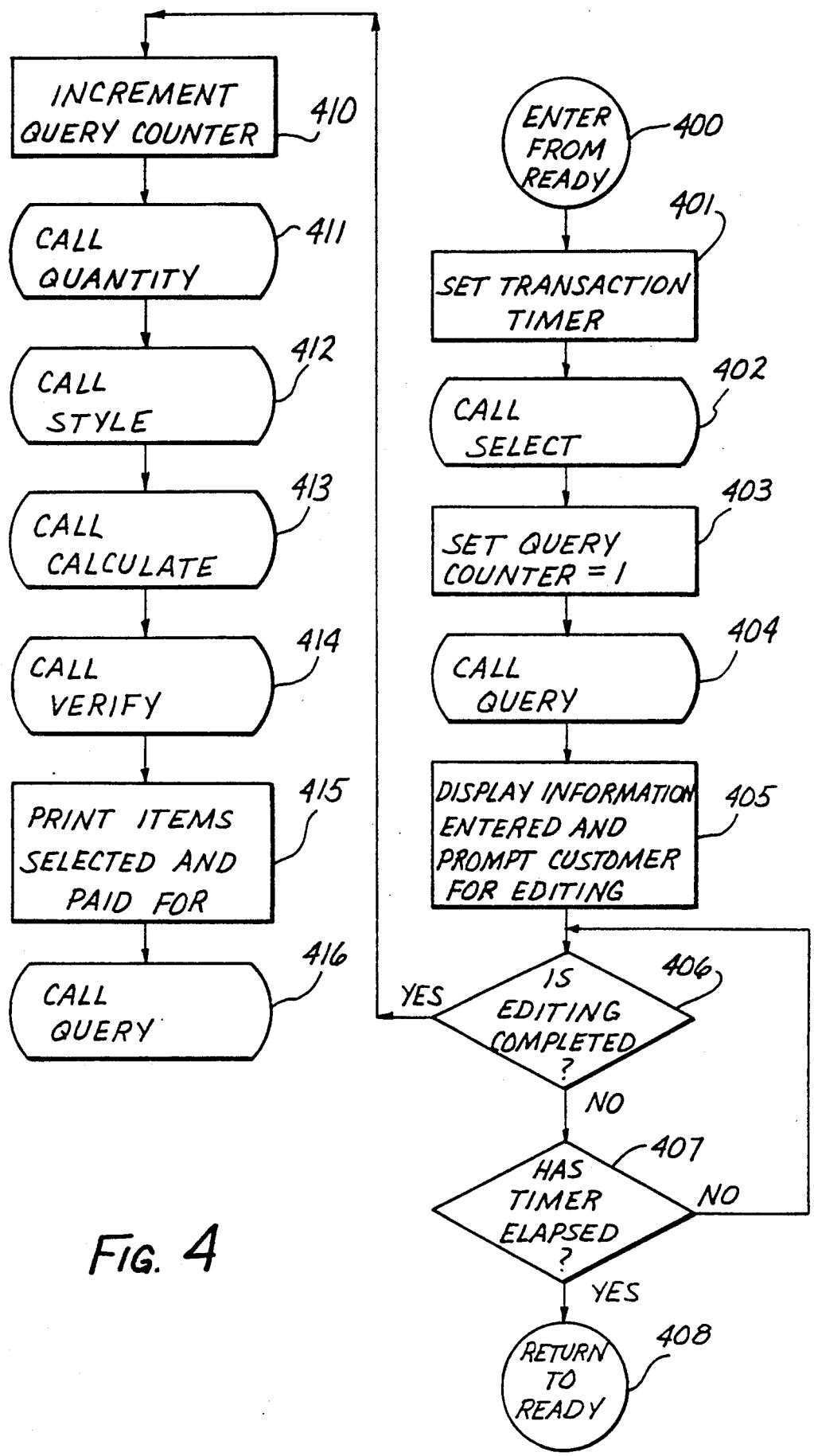

The various programs for carrying out the operations of the terminal 11 are of a "menu type" and can best be understood with reference to the flow diagram of FIGS. 3 and 4. FIGS. 3 and 4 shows the sequence of operations carried out at the sales terminal 11 by the data processing personal computer 12, in response to input from the keyboard terminal 17.

The sequence of operations basically comprises the following steps:

1. terminal waits detection of a customer;
2. terminal actuated by customer;
3. information gathering message played;
4. customer selects labels and enters necessary information;
5. customer entered information displayed on monitor for editing and corrections by customer;
6. customer makes corrections if any;
7. system prompts customer for quantity of labels desired;
8. information relayed to data processing personal computer;
9. data processing personal computer forms label quotation calculations, and relays the information back to the video terminal;
10. information given to customer on monitor screen;
11. customer asked if he or she wishes to make purchase;
12. if customer wishes to purchase label, payment is received and relayed to the data processing person computer center;
13. the data processing personal computer determines whether the appropriate payment has been received for the requested labels and if change is required or a different monetary bill is required;
14. if additional money is required or if a different bill is required the amount or bill information is communicated to the terminal and displayed to the customer; and
15. if proper payment is made, the order is taken and a set of labels are issued to the customer at the terminal.

The steps will now be described in more detail with reference to FIG. 2.

Referring now to FIG. 3, after the system has been powered up, a terminal program READY will automatically start from enter instruction 300 and then proceed to a decision instruction 301 to await system actuation by a customer. When a customer actuates the activation switch 20, such as an infrared detection device, of the terminal 11, the interface unit 13 is activated and sends a signal to the personal computer CPU 12. When the CPU 12 receives the actuation signal, the program advance to instruction 302 to call the subroutine PROCESS that permits video subsystem 15 to play back a sales presentation. Once the subroutine PROCESS has been executed, the program returns to the ready state (instruction 300) waiting for a new customer.

Considering now the subroutine PROCESS in greater detail with reference to FIG. 4, the subroutine PROCESS is entered from the READY routine at instruction 400 and proceeds to instruction 401.

The program instruction 401 sets the transaction timer to 5 minutes. The program then proceeds to instruction 402 and calls the subroutine SELECT which will be described hereinafter in greater detail. While in the SELECT subroutine, the program will prompt the customer to select an item from its menu that includes various types of labels and other printed matter such as business cards, resumes, and letterhead paper. When the type of printed matter has been selected by the customer, the program proceeds to instruction 403 and sets a Query counter to one. The program then proceeds to instruction 304 and calls the QUERY subroutine which will be described hereinafter in greater detail. While in the QUERY subroutine a series of pertinent questions appear on the monitor 29 for the particular type of material selected by the customer. The program prompts the customer to respond to each question. The customer enters responses from the keyboard, the responses are shown on the monitor screen. Once all the pertinent information is entered, the program proceeds to instruction 405 to reformat the customer's input and to display the entered information for customer verification so the customer may make any necessary changes to the information previously entered into the system. The program proceeds to decision instruction 406 to determine if the customer has completed editing. If an editing completed signal has not been received the program proceeds to instruction 407 to determine whether the transaction time has elapsed. If no answer is received from the customer within the predetermined transaction time limit, the program assumes the customer has left the terminal and proceeds to instruction 408 that return the system to the ready state (instruction 200) to wait for the next customer. If the timer has not elapsed, the program loops back to instruction 405 so the customer may continue the editing process. Once the information has been edited, the program then proceeds to instruction that increments the Query counter. The program then proceeds to instruction 411 and calls the subroutine QUANTITY which will be described hereinafter in greater detail. While in the QUANTITY subroutine the program requests the customer to enter the quantity of materials required so that a determination may be made that the system has a sufficient quantity of printing materials to fill the customer's order if placed.

If the quantity required by the customer exceeds the available supply, the system will display a message on the monitor notifying the customer of the lesser quantity that may be ordered. If the customer desires to purchase the lesser quantity indicated the program proceeds to instruction 308. If no response is received the system returns to the ready state.

Once the available and ordered quantity has been determined, the program proceeds to instruction 308 and calls the subroutine STYLE to determine if any special options are required by the customer such as typestyle, formats, etc. The subroutine STYLE will be described hereinafter in greater detail.

Once all the necessary information has been gathered at the terminal that includes type, data, style and quantity, the program proceeds to instruction 413 so that the interface unit 13 may transmit the gathered information to the data processing personal computer 12 via interface 13. The instruction 413 calls the subroutine CALCULATE that will be described hereinafter in greater detail. The personal computer 12 performs the desired quote calculation, and sends the quotation information back to the terminal for display on the video monitor 29. This information is also transmitted to the coin and bill acceptor 18.

On receipt of the quotation the program proceeds to instruction 404 and calls the subroutine VERIFY that will be described hereinafter in greater detail. While in the VERIFY subroutine, the customer is asked if he or she wants to purchase the requested labels based on the quotation. If the answer is no, the customer is thanked and the terminal returns to the ready state at instruction 200 to wait for the next customer. If the answer is yes, the program prompts the customer to insert the appropriate amount of payment for the requested materials and the payment verification process is completed by the subroutine VERIFY. If the customer fails to insert the proper amount of money within the predetermined transaction time the program returns to the ready state at instruction 200 to wait for the next customer. If the customer inserts money into the coin and bill acceptor 18, the bill and coin acceptor 18 transmits the information regarding the amount of money that it has received from the customer to the data processing personal computer 12 for verification of the proper sum. The data processing personal computer 12 determines that the customer has inserted a bill that is too large to remit change. The computer 12 instructs the bill and coin acceptor to return the inserted money to the customer. If the bill is too large a message will be displayed notifying the customer and requesting a smaller bill. If the requested amount is not inserted into the coin and bill acceptor 18 the program returns to the ready state. This procedure results in either rejection or acceptance of payment, and corresponding data is transmitted from the data processing personal computer 12 to the interface unit 13 so the appropriate response may be displayed on the video terminal 29.

If payment is accepted the bill and coin acceptor 18 sends an accept signal and the program displays the total amount paid and then proceeds to instruction 415 where the label information previously collected is transmitted to the interface unit 13 and a label print sequence is initiated. The label information sent by the data processing personal computer 12 to the label printer 19 to cause the labels to be printed and dispensed to the customer. The program proceeds to instruction 415. Instruction 415 calls the subroutine QUERY which will be described hereinafter in greater detail. While in the subroutine the customer is asked to respond to a series of demographic questions. The program returns to the READY state if the customer does not respond. After the customer answers the questions, the answers are stored and the program returns to the ready state.

The sequence of operations carried out by the data processing personal computer 12 in performing quotation calculations, carrying out payment verification, and issuing label commands, will now be described with reference to the flow diagram parts, shown in FIGS. 5-10.

Figure 5:
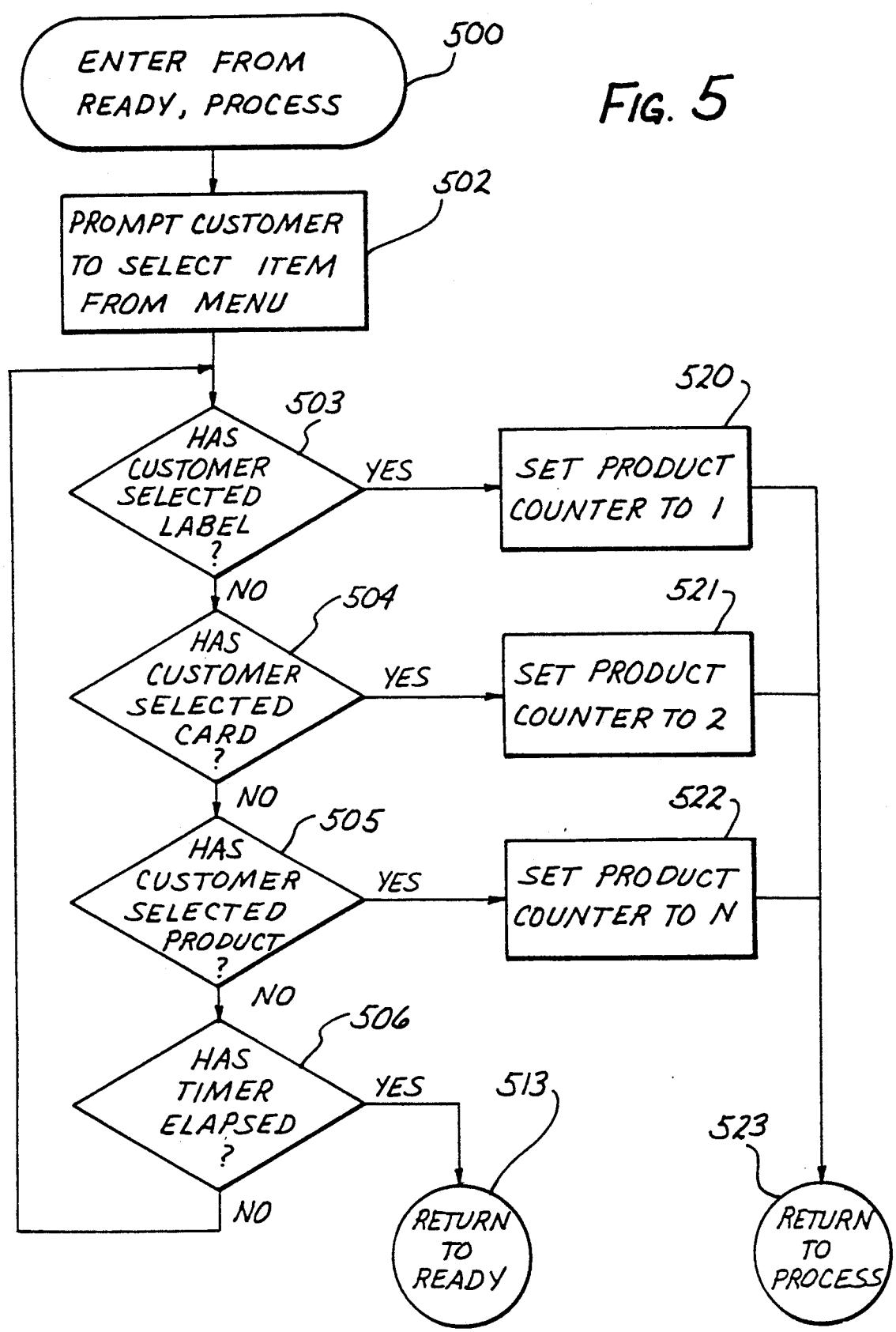

Considering now the subroutine SELECT in greater detail with reference to FIG. 5, the subroutine SELECT is entered at instruction 500 from the process subroutine and proceeds to instruction 502 which prompts the customer to select an item from the menu. The program then proceeds to instruction 503 to determine whether the customer has selected labels that the response is new the program proceeds to instruction 504 to determine whether the customer has selected business cards. If the customer has not selected business cards, the program proceeds to instruction 505 to determine whether the customer has selected another product such as a resume or letterhead paper. If the response is no, the program proceeds to instruction 506 to determine whether the transaction timer has elapsed. If the timer has not elapsed, the program loops back to instruction 502 and again prompts the customer to select an item from the menu. This process continues looping between constructions 502 to 506 until the customers either actually made a selection or until the timer has elapsed. In the event the timer has elapsed, the program will proceed from instruction 506 to instruction 513 which will return the system to the ready state. If the customer has selected a label, the program will exit the loop at instruction 503 and proceed to instruction 520 and will set a product counter to a quantity that designates that labels were selected. The program proceeds from instruction 520 to instruction 523 which returns the program to the process SUBROUTINE. If the customer has selected cards, the program proceeds from instruction 504 to instruction 521 which sets the product counter to a member product counter to a number that designates that the customer has selected cards. The program proceeds from instruction 521 to instruction 523 to return the program to the process subroutine. If the customer has selected some other product, the program proceeds from instruction 505 to instruction 522 that sets the product counter to a number that designates the other products selected by the customer. After the product counter has been set in instruction 522, the program proceeds to instruction 523 which returns the program to the process subroutine.

Figure 6:
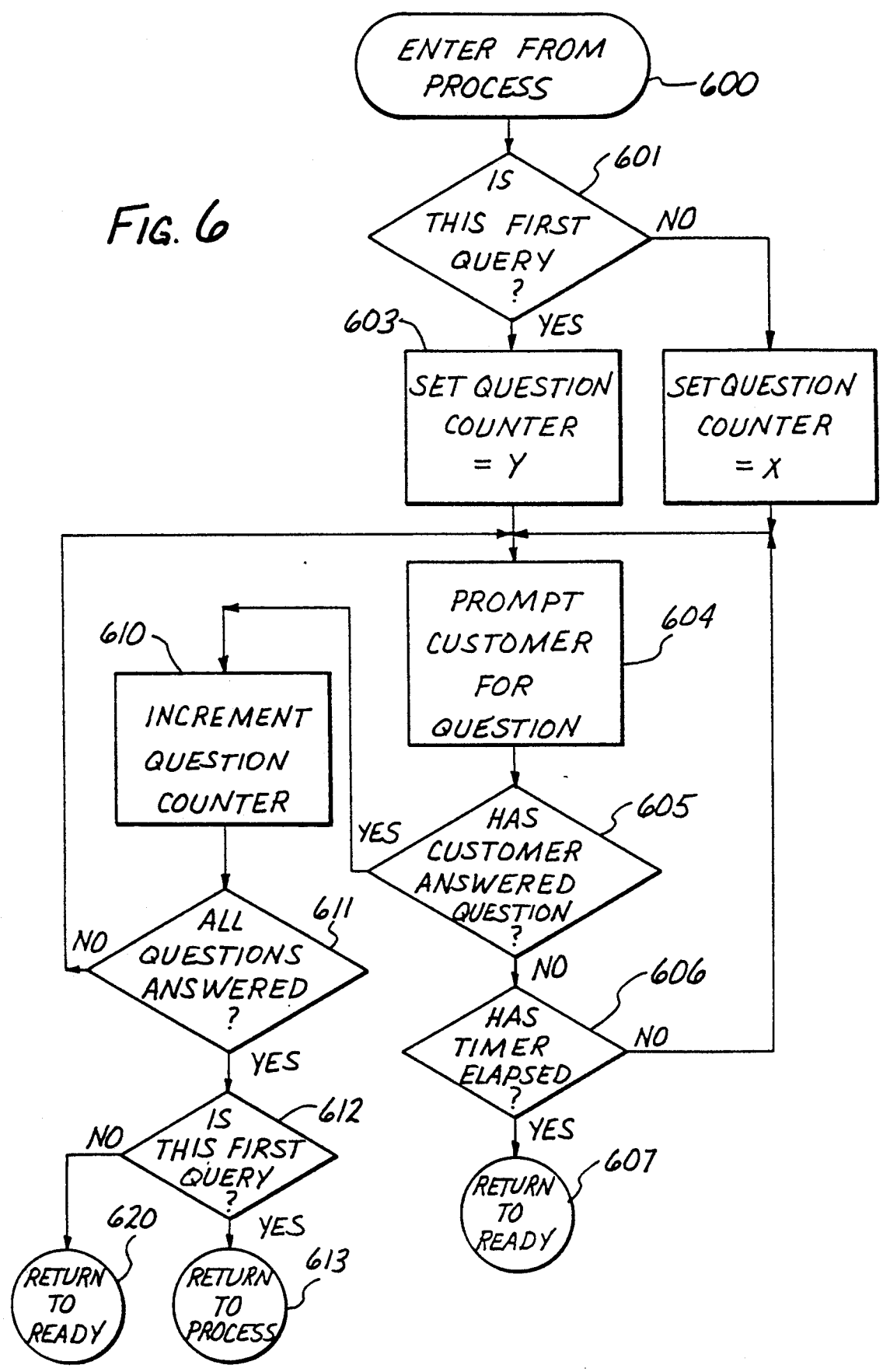

Considering now the subroutine QUERY in greater detail with reference to FIG. 6, the subroutine QUERY is entered from the subroutine process at instruction 600. Upon entering the subroutine, the program proceeds to decision instruction 601, which determines whether this is the first QUERY process. If the answer is no the program proceeds to instruction 630 and sets the question counter to a predetermined number so that questions pertain to other than the first QUERY process. The program then proceeds to instruction 604.

If the answer is YES the program proceeds to instruction 603 which sets the question counter to a predetermined number so that the questions pertain to the first QUERY process. The program them proceeds to instruction 604 which prompts the customer for the information based on the question counter. The program proceeds from instruction 604 to instruction 605 to determine whether the customer has answered the first question. If the customer has not answered the first question, the program proceeds to instruction 606 to determine whether the transaction timer has elapsed. If the timer has not elapsed, the program loops back to instruction 604 and again prompts the customer to answer the question. If the timer has elapsed, the program will proceed from instruction 606 to instruction 607 which will return the program to the ready state. If the customer has answered the question, the program will proceed from instruction 605 to instruction 610 which will increment the question counter so that a new question will be displayed for the customer's consideration. After incrementing the question counter, the program proceeds to instruction 611 to determine whether all the questions have been answered by the customer. If the answer is no, the program loops to instruction 604 which prompts the customer with the new question. If the response is yes, the program proceeds to decision instruction 612 to determine whether this is the first QUERY process. If the answer is yes, the program proceeds to instruction 613 which returns the program to the subroutine PROCESS. If the answer is no, the program proceeds to instruction 620 which returns the program to the ready state.

Figure 7:
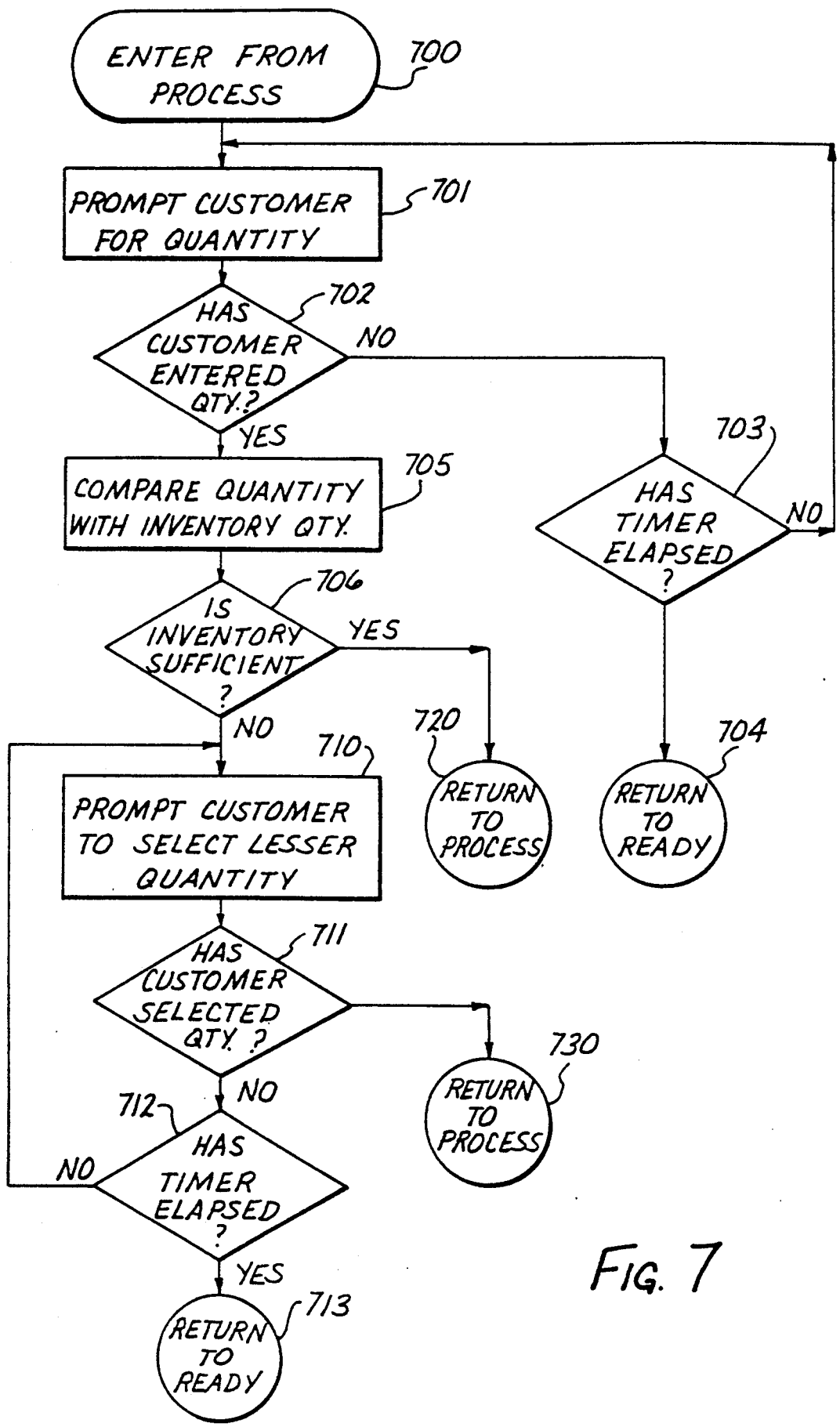

Considering now the subroutine QUANTITY in greater detail, with reference to FIG. 7, the subroutine QUANTITY is entered at instruction 700 from the subroutine PROCESS and proceeds to instruction 701 which prompts the customer for the quantity of materials that are desired. The program then proceeds to decision instruction 702 to determine whether the customer has entered the quantity. If the answer is no, the program proceeds to decision instruction 703 to determine whether the timer has elapsed. If the answer is no, the program moves back to instruction 701 and again prompts the customer to enter the quantity desired. If the timer has elapsed, the program proceeds from instruction 703 to instruction 704 which returns the program to the ready state. If the customer has entered the quantity, the program proceeds from decision instruction 702 to instruction 705 which compares the requested quantity with the inventory quantities that are available to fill the customer's order. The program then proceeds to decision instruction 706 to determine whether the inventory quantity is sufficient to fill the customer's order. If the inventory quantity is sufficient, the program proceeds to instruction 720 which returns the program to the process subroutine. If the quantity is insufficient, the program proceeds from instruction 706 to instruction 710 and notifies the customer and prompts the customer to select a lesser quantity. The program then proceeds to decision instruction 711 to determine whether the customer has selected a lesser quantity. If a lesser quantity has not been selected, the program proceeds to decision instruction 712 to determine whether the timer has elapsed. If the timer has not elapsed, the program loops back to instruction 710 and again prompts the customer to select the lesser quantity. If the timer has elapsed, the program proceeds to instruction 713 which returns the program to the ready state. If the customer does select a lesser quantity, the program proceeds from instruction 711 to instruction 730 which returns the program to the subroutine process.

Figure 8:
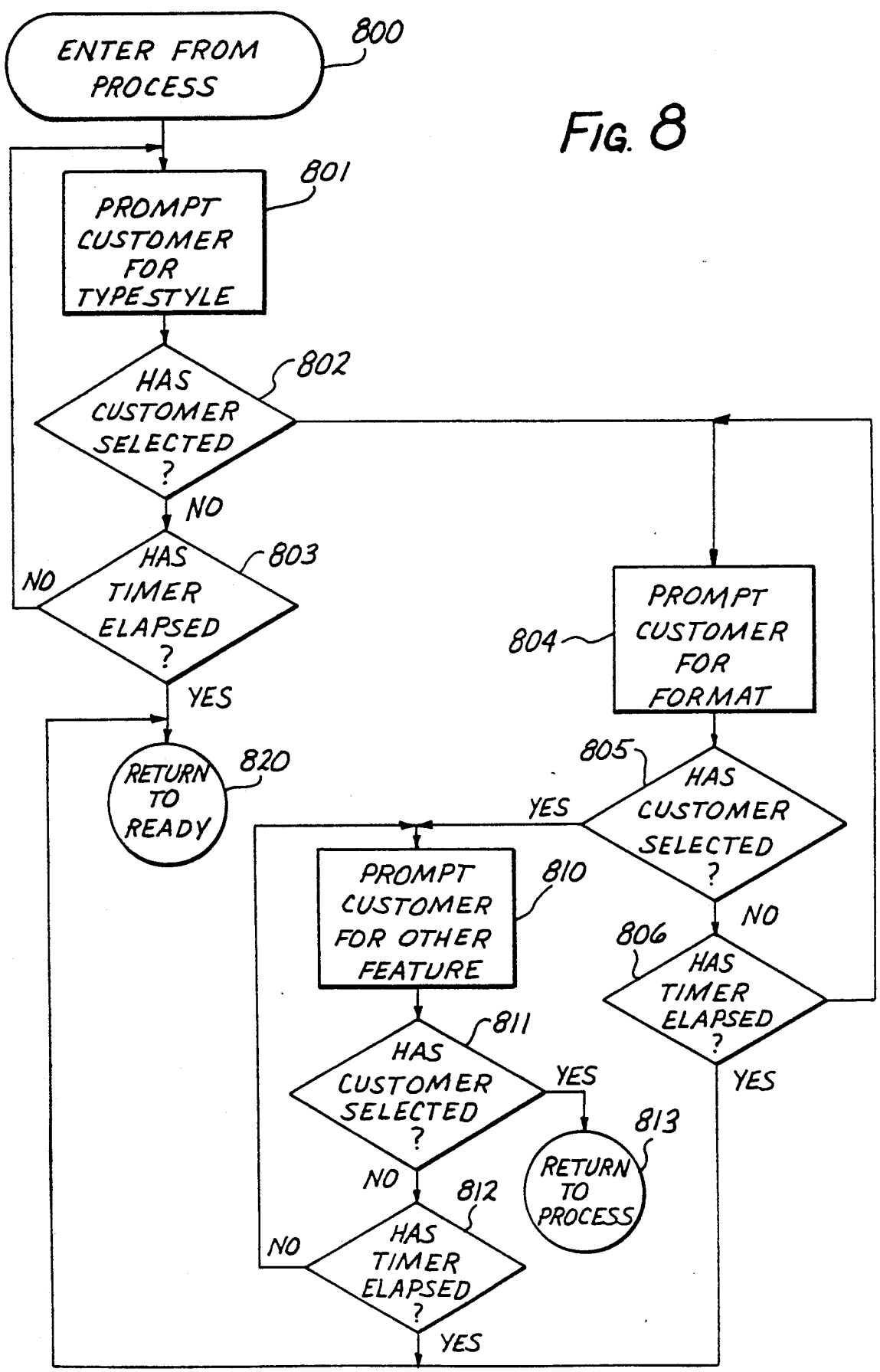
Figure 9:
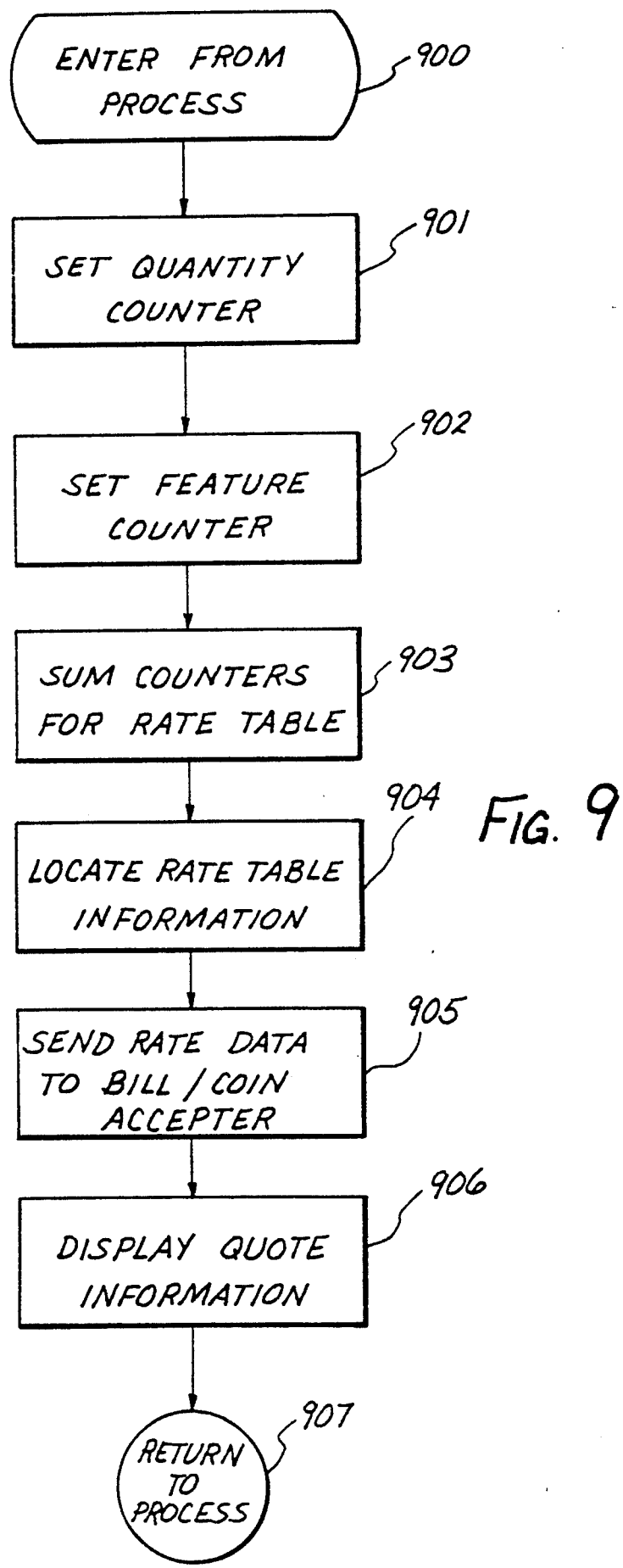

Considering now the subroutine STYLE in greater detail with reference to FIG. 8, the subroutine STYLE is entered at instruction 800 from the subroutine PROCESS. The program proceeds from instruction 800 to instruction 801 which prompts the customer or the typestyle desired on the selected item. The program then proceeds to decision instruction 802 determine whether the customer has selected one of the available typestyles. If the response is no, the program proceeds to decision instruction 803 to determine whether the timer has elapsed. If the timer has not elapsed, the program loops back to instruction 801 and again prompts the customer to select one of the available typestyles. If the timer has elapsed, the program proceeds from instruction 803 to instruction 820 which returns the program to the ready state. If the customer has made a selection, the program proceeds from instruction 802 to instruction 804 which prompts the customer to select one of the available formats. The program then proceeds from instruction 804 to decision instruction 805 to determine whether the customer has made a selection of one of the formats. If the answer is no, the program proceeds to decision instruction 806 to determine whether the timer has elapsed. If the timer has elapsed, the program proceeds to instruction 820 which returns the program to the ready state. If the timer has not elapsed, the program moves back to instruction 804 and again prompts the customer to make a selection of one of the formats. If the customer has made a selection of format the program proceeds from instruction 805 to instruction 810 and prompts the customer for other available features that are provided. The program then proceeds to instruction 811 to determine whether the customer has made one of the other feature selections. If the customer has not made one of the other available feature selections, the program proceeds to decision instruction 812 to determine whether the timer has elapsed. If the timer has elapsed, the program proceeds to instruction 820 which returns the program to the ready state. If the timer has not elapsed, the program moves back to instruction 810 and again prompts the customer to select one of the other features. If the customer has selected one of the other features, the program proceeds from instruction 811 to instruction 813 which returns the program to the subroutine process.

Considering now the subroutine calculate in greater detail with reference to FIG. 5, the subroutine calculate is entered at instruction 700 from the subroutine PROCESS. The program then proceeds from instruction 700 to instruction 701 which sets the quantity counter based upon the quantity selected by the customer. The program proceeds to instruction 902 and sets the feature counter which indicates the number of features selected by the customer. The program then proceeds to instruction 904 which sums the various type quantity and feature counters so that the rate table may be accessed for a quotation calculation. The program then proceeds to instruction 904 which locates the rate information from the rate table. Once the rate information has been located in the rate table, the program proceeds to instruction 905 which sends the rate information to the bill and coin acceptor and displays the quotation information on the monitor for the customer's consideration. The program then proceeds from instruction 905 to instruction 906 which returns the program to the PROCESS subroutine.

Considering now the subroutine VERIFY in greater detail with reference to FIG. 10, the subroutine VERIFY is entered from instruction 1000 from the subroutine process. The program proceeds from instruction 1000 to instruction 1001 which prompts the customer as to whether or not he or she desires to make a purchase. The program proceeds from instruction 1001 to decision instruction 1002 to determine whether or not the customer has made a request. If the response is no, the program proceeds to decision instruction 1003 to determine whether the transaction timer has elapsed. If the transaction timer has elapsed, the program proceeds to instruction 1004, which returns the program to the ready state. If the timer has not elapsed, the program loops back to instruction 1001 and again prompts the customer to make a purchase. If the customer has made a request for purchase, the program proceeds from instruction 1002 to instruction 1010 which prompts the customer to insert the quoted purchase price. The program then proceeds to instruction decision instruction 1011 to determine whether or not the customer has inserted the requested amount of money. If the answer is no, the program proceeds to decision instruction 1012 to determine whether the transaction timer has elapsed. If the transaction timer has elapsed, the program proceeds to instruction 1013 which returns the program to the ready state. If the transaction timer has not elapsed, the program loops back to instruction 1010 and again prompts the customer to insert the required amount of money. If the customer has inserted money into the coin and bill acceptor the program proceeds from instruction 1011 to decision instruction 1020 which determines whether or not the dollar bill amount was too large for the coin and bill acceptor to remit a proper amount of change. The bill was too large, the program proceeds to instruction 1021, which returns the bill to the customer and prompts the customer to insert a smaller denominational amount. The program proceeds from instruction 1021 back to instruction 1010 and again prompts the customer to insert the money. If the bill that was inserted by the customer is not too large, the program proceeds from decision instruction 1020 to instruction 1030 which instructs the bill and coin acceptor to continue its escrow process. The program proceeds from instruction 1030 to instruction 1031 to determine whether or not an accept signal has been generated by the coin and bill acceptor 18. If no accept signal has been received, the program proceeds to decision instruction 1032 to determine whether the transaction timer has elapsed. If the transaction timer has elapsed, the program proceeds to instruction 1033 which returns the program to the ready state. If the timer has not elapsed, the program proceeds from instruction 1032 back to instruction 1010 and again prompts the customer for money. If the bill and coin acceptor has generated an accept signal, the program proceeds from decision instruction 1031 to instruction 1040 which returns the program to the subroutine PROCESS.

The system of this invention allows a customer quick and easy access to label quotations from several different types of labels, and allows the customer to make a selection and purchase of labels on a self-service basis. All the necessary operations of obtaining information, receiving payment, and issuing labels, are carried out automatically. This results in considerable savings in time and money for the customer and companies alike and will potentially result in more sales and self-service terminals may be established in many more areas that would normally be serviced by printing offices and representatives.

It will be clear that modifications can be made to the disclosed embodiment without departing from the scope of the invention. The scope of the invention is therefore not limited to the disclosed embodiment but is defined by the appended claims.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A system for vending customized documents, comprising:
   customer actuated input means for receiving information from a customer, said information including customized information for a customized document to be produced;
   computer means for processing said customized information to generate a customized document to be produced;
   means responsive to said information being received for generating and supplying to the customer cost information for using the system to produce said customized document;
   means responsive to receipt of payment to use the system for generating signals indicative of payment being received for producing the customized document to be produced;
   printer means for transferring the customized information to customized document paper stock;
   means responsive to said signals indicative of payment being received for retrieving the processed customized information;
   means for supplying the retrieved processed customized information to said printer means;
   means responsive to said retrieved information for causing said printer means to deposit indicia on the paper stock, said indicia configured in the shape of the processed customized information for producing the customized document; and customer actuation switch means for initiating the operation of the system, wherein said switch means includes an infrared proximity switch for generating a signal in response to the presence of a customer in the proximity of the system.

2. A system according to claim 1, wherein said means responsive to payment includes means for generating signals indicative of an overpayment being received for returning the payment made to the customer and for supplying correct payment request information to the customer.

3. A system according to claim 1, wherein said computer means is a personal computer.

4. A system according to claim 3, wherein said computer includes a video subsystem.

5. A system according to claim 4, wherein said video subsystem includes a video controller and memory means.

6. A system according to claim 4, wherein said input means includes a computer keyboard forming a part of said personal computer.

7. A system according to claim 6, wherein said personal computer includes a computer processor unit coupled in communication with said keyboard.

8. A system according to claim 1, wherein said printer means includes a computer printer.

9. A system according to claim 8, wherein said computer printer is a laser printer.

10. A system according to claim 9, further including customer actuation switch means for initiating the operation of the system.

11. A customer sales and information terminal for vending automatically customized documents comprising:

processor means for storing labels and price rate information for given labels and customer sales information;

a communication terminal including means for linking said terminal with said processor means and for transmitting data between said processor means and a customer;

said communication terminal including:

visual means for interaction with a customer;

means for storing a sequence of video information to be selectively transmitted to a customer;

means for transmitting a selected sequence of said stored information to the customer;

customer operated input means for gathering information from a customer and for accepting customer orders for a label;

means for controlling, storing and transmitting means in response to customer input to transmit a selected sequence of information to the customer;

said communication terminal further including:

means for storing information and order input by a customer;

means for transmitting said information in a customer order via interface means to said processor means;

means for receiving data comprising customer selected information and label quotation from said processor means via said interface means;

means responsive to said data receiving means for vending labels to the customer;

means for directing the operation of said visual means, data receiving and transmitting means, and vending means comprising algorithm means for programming their operational sequence and means responsive to the status of various means for controlling their operation;

said processor means including:

means responsive to the data received from said communication terminal for transmitting selected stored information to said terminal via said interface; and means responsive to a customer sales order from said communication terminal for transmitting said order to said label printer via said interface means for vending labels.

12. The system of claim 11, further including a payment receiving device interfaced to said processor means, said communication terminal including:

means responsive to a customer order for receiving payment from the customer in transmitting said payment information to said processor means, and said processor means including means responsive to said payment information for assessing said payment information based on payment, and transmitting the results to said communication terminal.

13. The system of claim 12, wherein said payment information collecting means comprises a bill and coin mechanism.

14. The system of claim 11, wherein said visual means includes a cathode ray tube display unit and said input means comprises a keyboard terminal.

15. The system of claim 11, wherein said means for vending labels to said customer includes a laser printer unit.

* * * * *

UNITED STATES PATENT AND TRADEMARK OFFICE
CERTIFICATE OF CORRECTION

PATENT NO. : 5,029,099

DATED : July 2, 1991

INVENTOR(S) : Sidney Goodman

It is certified that error appears in the above-identified patent and that said Letters Patent is hereby corrected as shown below: On the title page item (56) after "4,674,055 6/1987," delete "Osaki et al." and substitute thereof "Ogaki et al."

In the U.S. Patent Document after 4,677,565 6/1987", delete "osaki et al". and substitute thereof "Ogaki et al."

Column 13 Line 32, delete "9", and substitute therefor --1--

Signed and Sealed this

Twenty-seventh Day of October, 1992

Attest:

DOUGLAS B. COMER

Attesting Officer     Acting Commissioner of Patents and Trademarks